US008589553B2

(12) United States Patent
Kruse et al.

(10) Patent No.: US 8,589,553 B2
(45) Date of Patent: Nov. 19, 2013

(54) DIRECTORY LEASING

(75) Inventors: David Matthew Kruse, Kirkland, WA (US); Mathew George, Bellevue, WA (US); Sarosh Cyrus Havewala, Kirkland, WA (US); Christian Gregory Allred, Snohomish, WA (US); Neal Robert Christiansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 12/885,384

(22) Filed: Sep. 17, 2010

(65) Prior Publication Data
US 2012/0072596 A1 Mar. 22, 2012

(51) Int. Cl.
*G06F 15/173* (2006.01)

(52) U.S. Cl.
USPC ............ 709/226; 709/223; 709/224; 709/225

(58) Field of Classification Search
USPC .......................................................... 709/226
See application file for complete search history.

(56) References Cited

U.S. PATENT DOCUMENTS

| | | | |
|---|---|---|---|
| 4,897,782 A | 1/1990 | Bennett et al. | |
| 6,757,705 B1 | 6/2004 | Pardikar et al. | |
| 7,702,745 B2 | 4/2010 | Lin et al. | |
| 7,912,858 B2 * | 3/2011 | Fleck et al. | 707/783 |
| 2005/0172078 A1 | 8/2005 | Wu et al. | |
| 2007/0083522 A1 | 4/2007 | Nord et al. | |
| 2007/0094354 A1 * | 4/2007 | Soltis | 709/218 |
| 2008/0028033 A1 | 1/2008 | Kendall | |
| 2008/0077655 A1 | 3/2008 | Ganapathy et al. | |
| 2008/0162582 A1 | 7/2008 | Brooks et al. | |
| 2010/0185704 A1 * | 7/2010 | George et al. | 707/821 |
| 2011/0072126 A1 * | 3/2011 | Wujuan et al. | 709/224 |

OTHER PUBLICATIONS

Liao et al., "An Implementation and Evaluation of Client-Side File Caching for MPI-IO", 2007 IEEE, 10 pages.
Havewala, Sarosh, "Announcement: File System Filters and SMB2 Leasing (enhanced oplocks)", http://www.osronline.com/showthread.cfm?link=160187, 2005, 5 pages.
Shepler et al., "NFS version 4 Protocol", The Internet Society (2000), 212 pages.
"SMB2 Client Redirector Caches Explained", http://technet.microsoft.com/en-us/library/ff686200(WS.10).aspx, Mar. 25, 2010, 1 page.
What's New in SMB, Apr. 14, 2010, 4 pages.

(Continued)

*Primary Examiner* — Douglas Blair
*Assistant Examiner* — Angela Nguyen
(74) *Attorney, Agent, or Firm* — Merchant & Gould PC

(57) ABSTRACT

Described are embodiments for allowing clients that access a distributed file system to locally cache directory metadata. The client may request a read lease which allows the client to cache the directory metadata locally and service requests received from the same application which originally requested the directory metadata using the cache. In addition, the client may also request a handle lease which allows a client to delay the closing of a directory handle and allow the handle to be reused to service subsequent directory metadata requests from the same or a different application. A client may also request a write lease which allows an application on the client to modify the directory metadata, such as by creating or deleting new files in the directory, or changing their attributes, and cache those changes.

20 Claims, 7 Drawing Sheets

(56) References Cited

OTHER PUBLICATIONS

PCT International Search Report and Written Opinion in Application No. PCT/US2011/050573 mailed on Apr. 24, 2012, 9 pgs.

Howells, David, "FS-Cache: A Network Filesystem Caching Facility", Proceedings of the 2006 Linux Symposium, 14 pages.
Liu et al., "Prefetching and Caching Metadata in a Distributed NFS Server", 2000, 6 pages.

* cited by examiner

DIRECTORY LEASING

BACKGROUND

It is common for applications on clients to access files stored in a distributed file system. Distributed file systems provide for accessing remotely stored files, transparently to an application running locally on a client. Distributed file systems can include some features that allow a client to cache some information locally so that some requests are serviced with local information which is more efficient than retrieving the information remotely. However, current distributed file systems do not have mechanisms for caching information such as metadata (e.g. directory metadata) which provide consistency and coherency among clients accessing the distributed file system.

It is with respect to these and other considerations that embodiments of the present invention have been made. Also, although relatively specific problems have been discussed, it should be understood that embodiments of the present invention should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Described are embodiments for allowing clients that access a distributed file system to locally cache directory metadata. In one embodiment, a client requests a lease from a file server to cache directory data. The client may request a read lease which allows the client to cache the directory metadata locally and service requests from the same application which originally requested the directory metadata. In addition, the client may also request a handle lease which allows a client to delay the closing of a directory handle and allow the handle to be reused to service subsequent directory metadata requests from the same or a different application, on the client. In some embodiments, the server relies on two lease keys to keep track of client leases and ensure that changes to the directory metadata made by a client, which owns a read lease on the directory metadata, do not result in the read lease being revoked. In other embodiments, a client may request a write lease which allows an application on the client to modify the directory metadata, such as by creating or deleting files in the directory or changing their attributes and cache those changes. When another client requests the directory metadata the write lease is broken and the changes are flushed to the server.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
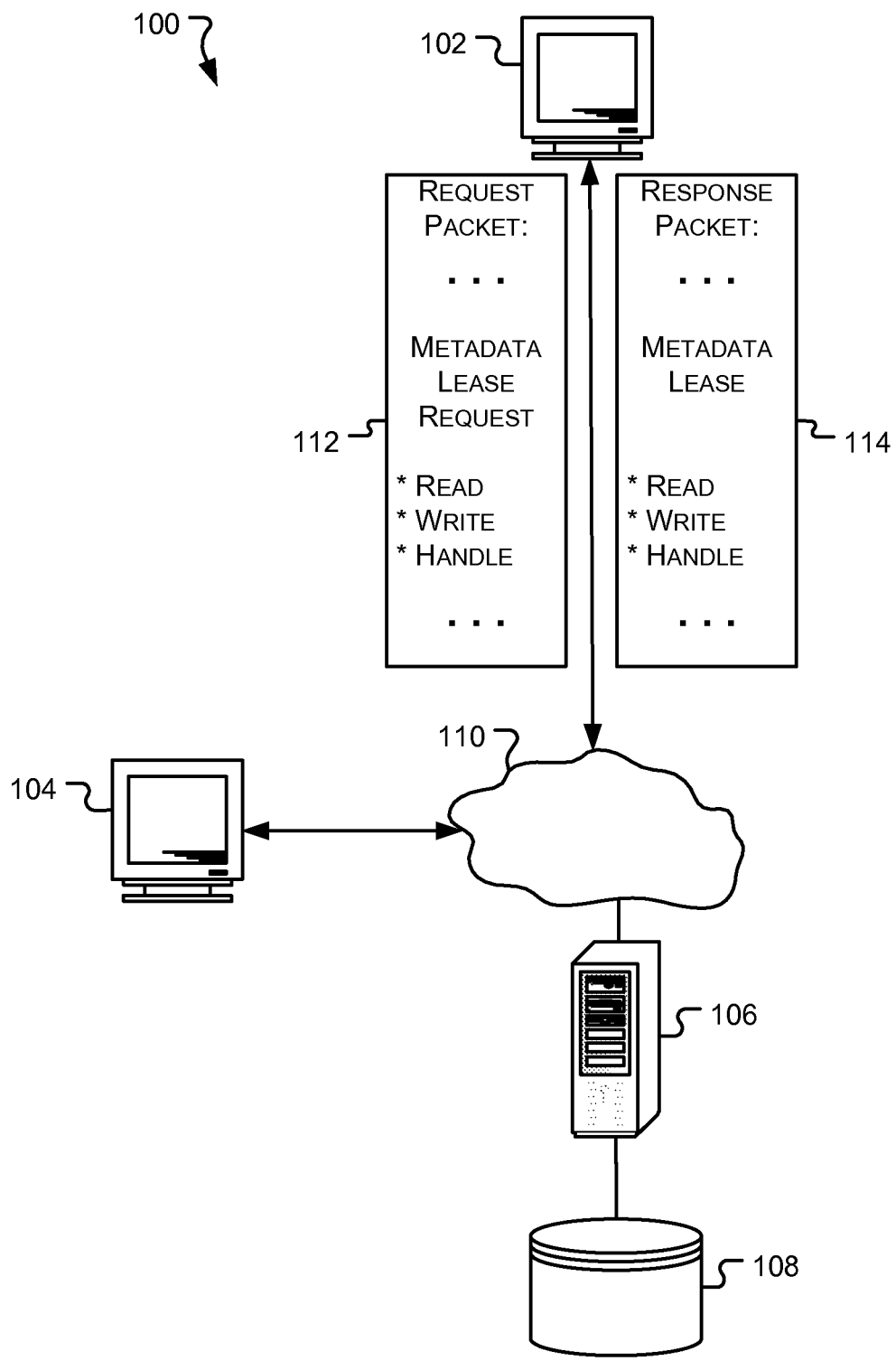
FIG. 1 illustrates an embodiment of a system that may be used to implement some embodiments.

FIG. 1 illustrates an embodiment of a distributed file system 100 in which embodiments are implemented. System 100 includes clients 102 and 104 that run various applications that require access to files and file information. A file server 106 stores files and file information, for example in data store 108. Clients 102 and 104 may access file server 106 through a network for example network 110. As those with skill in the art will appreciate, network 110 may be a LAN, WAN (e.g., the Internet), storage area network, or other network that allows clients 102 and 104 to communicate with file server 106.

Distributed file system 100 may implement a protocol for allowing clients 102 and 104 to access file server 106. Some nonlimiting examples of protocols include Server Message Block (SMB), SMB2, and NFS. As those with skill in the art will appreciate, file access protocols provide different formats for clients to request files from a file server. Embodiments are not limited to any particular file access protocol. Rather, features of the described embodiments may be implemented using any file access protocol including but not limited to those listed above.

In one embodiment, clients 102 and 104 may request a lease from file server 106 that allows them to locally cache directory metadata. As may be appreciated by those of skill in the art, file server 106 may, in addition to storing actual file data, also store directory metadata that describes characteristics of the files in a directory. For example, the directory metadata may include without limitation a date of last modification, a creation date, file size, a file type, and author name for each file in a directory. This embodiment can be implemented by providing a leasing mechanism.

As illustrated in FIG. 1, some embodiments provide for a client such as client 102 to send a packet 112 to file server 106 with a metadata lease request. In embodiments, packet 112 may also include a request for metadata in addition to the lease request. For example, an application, such as a browser application may request directory metadata for a particular directory. In response to the request, client 102 may send packet 112, which will include a request for the metadata of the particular directory as well as a metadata lease request.

As shown in FIG. 1, packet 112 may specify a read lease, write lease, and/or a handle lease. A read lease will allow client 102 to store metadata of the directory in a local cache and each time the browser application requests the directory metadata the client may service the request from the local cache. A handle lease will allow client 102 to delay the closing of a directory handle allowing the client 102 to use the directory handle to service subsequent requests from the browser application as well as other applications that may request the directory metadata for the directory. A write lease allows a client to cache changes an application makes to the directory metadata.

In the embodiment shown in FIG. 1, the file server 106 sends a response packet 114 which includes the requested directory metadata and an indication of whether the requested lease was granted. Based on the response packet, client 102 caches the directory metadata if the lease request was granted and provides the directory metadata to the browser application. If the response packet indicates that the lease was not granted, client 102 will not cache the directory metadata but will merely provide the directory metadata to the browser application. If the client 102 was not granted a lease, then any subsequent request from the browser application for the directory metadata will result in the client requesting the directory metadata from the file server 106.

As described in greater detail below, granting leases to clients provides efficiencies in servicing requests from applications and reduces the need for clients to send multiple requests to the file server 106. Accordingly, in some embodiments file server 106 will generally grant leases to clients as long as another client does not currently hold a conflicting lease. To ensure coherency of directory metadata, file server 106 ensures that conflicting leases are not granted to different clients for particular directory metadata.

The description in FIG. 1 is merely provided to introduce some features of some embodiments. As described in greater detail below, other embodiments may provide for additional features. The description of FIG. 1 should not be used to limit the scope of any other embodiments.

Figure 2:
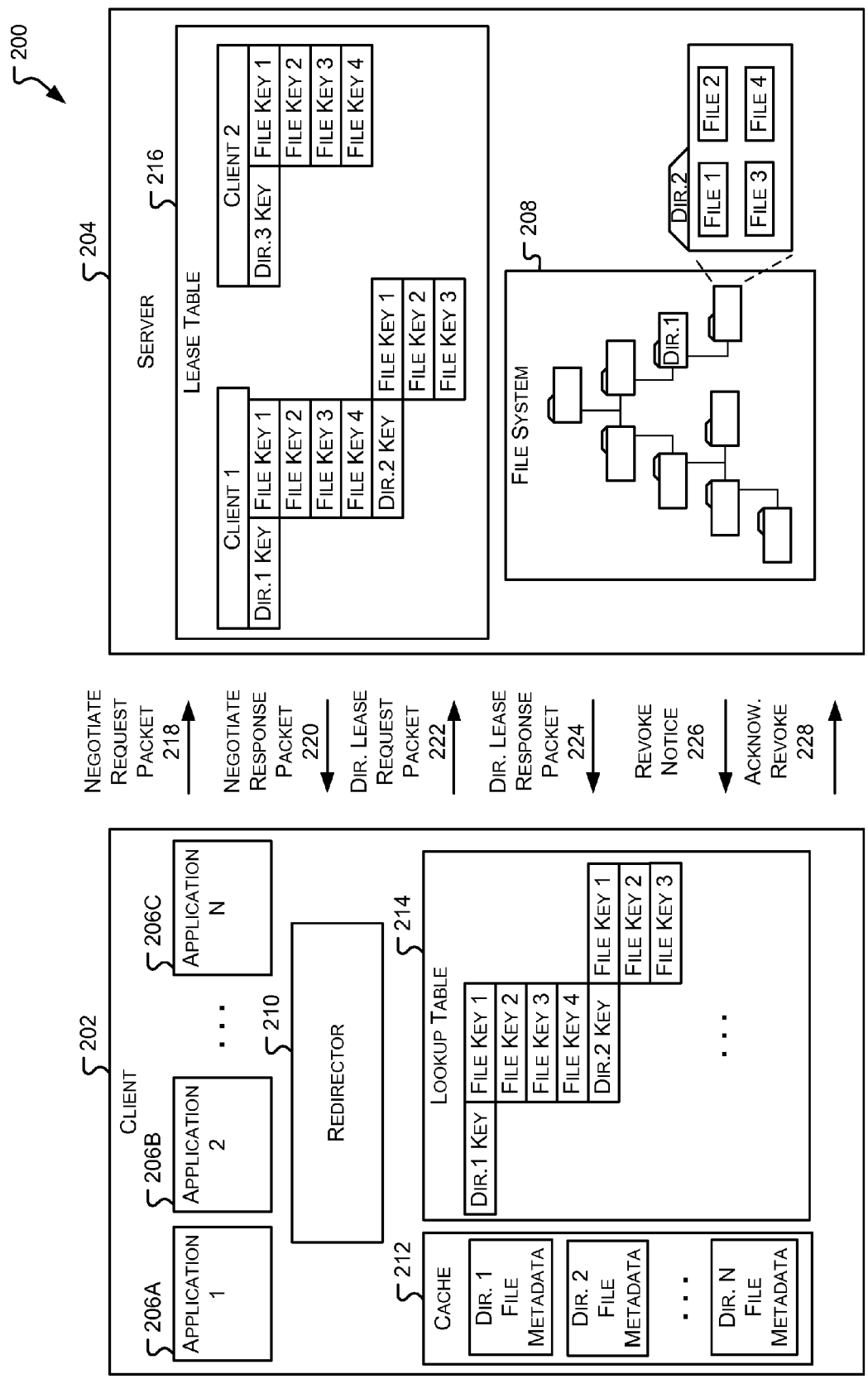
FIG. 2 illustrates a block diagram of a client and server that may be used in some embodiments.

FIG. 2 illustrates a block diagram of a client and server that may be used in some embodiments. As indicated above, different file access protocols may be used to implement features of the described embodiments. Some of the description of FIG. 2 that follows includes some description of features of SMB2. However, this should not be used to limit other embodiments because any file access protocol may be used to implement the features described. The use of SMB2 is only one example and is used only for purposes of illustration.

FIG. 2 shows a block diagram of a client 202 and file server 204 which are part of distributed file system 200. In some embodiments, client 202 may be implemented in system 100 (FIG. 1) as clients 102 and 104, while file server 204 may be implemented in system 100 (FIG. 1) as file server 106.

As shown in FIG. 2, client 202 includes a number of applications 206A-C that request access to file data and metadata stored in the file system 208 in server 204. Client 202 also includes redirector 210. In one embodiment, redirector 210 may be configured as an SMB2 redirector, and client 202 and server 204 communicate using packets formatted according to the SMB2 protocol. When one of applications 206A-C requests a file located on server 204, redirector 210 will handle the request. Redirector 210 will create packets formatted according to the SMB2 protocol with requests for file data and metadata. As described in greater detail below, in embodiments the SMB2 protocol is extended to provide for a leasing mechanism that allows for client 202 to store directory metadata in a local cache 212 on client 202. The leasing mechanism utilizes a lookup table 214 on client 202 which stores lease keys (directory keys/file keys) associated with leases granted by server 204. Server 204 also stores lease keys for clients that request and are granted leases. Server 204 uses lease table 216 to store lease keys.

As one example of the operation of system 200, application 206A may request metadata for files stored in a directory, e.g., Dir. 1, of file system 208. As a result, application 206A issues a request that is received by redirector 210. In response to receiving the request, redirector 210 will initiate a session with server 204 by sending a negotiate request packet 218. As those with skill in the art will appreciate, the negotiate request packet 218 will be formatted according to the SMB2 protocol which provides for negotiating a session between a client and a server. The negotiate request packet 218 will include information indicating whether the client is able to handle directory metadata leasing. In one embodiment, directory metadata leasing may be supported by only some versions of the SMB2 protocol and the negotiate request packet 218 may provide an indication that the client supports a version of the SMB2 protocol that supports metadata leasing and would like to communicate with the server using that version of the SMB2 protocol.

In response to the negotiate request packet 218, server 204 will send a negotiate response packet 220 which may include an indication of whether or not the server supports the version of the SMB2 protocol. In the current example, the negotiate response packet 220 indicates that the server agrees to communicate using a version of the SMB2 protocol that supports directory metadata leasing.

After the negotiation between client 202 and server 204 is complete, redirector 210 can then request the directory metadata being requested by application 206A. In one embodiment, redirector 210 will first generate a directory key associated with the directory metadata being requested, e.g., Dir. 2 Key. Additionally, redirector 210 also generates a key for the parent directory, in this case Dir. 1, that contains the directory metadata being requested. These keys are stored in a lookup table 214. As shown in the embodiment of FIG. 2, lookup table 214 associates a directory key with various file keys for files stored within the directory as well as directory keys for subdirectories within a directory. The lease keys are in some embodiments globally unique identifiers (GUIDS). They are not however limited to GUIDS.

Redirector 210 then sends a packet 222 that includes a request for the directory metadata in Dir. 2 and also requests a lease to the directory metadata in Dir. 2. As part of the lease request, redirector 210 includes the generated lease keys (i.e., directory key for Dir. 1 and the directory key for Dir. 2). In a different embodiment, redirector 210 does not generate any directory keys. Instead, packet 222 provides for the redirector 210 to indicate that the server should generate the lease keys.

When server 204 receives the directory lease request packet 222, it will retrieve the directory metadata from Dir. 2. Server 204 also determines whether it can grant the requested lease to client 202. Specifically, the server may consult a lease table 216 which stores lease keys (directory keys and file keys) for other leases that it has granted. In this example, no previous client has requested a lease to Dir. 2, as a result, server 204 stores the directory key for Dir. 1 and the directory key for Dir. 2 from the directory lease request packet 222 into lease table 216.

The server sends a directory lease response packet 224 with the directory metadata and an indication that the requested lease has been granted. In this case, the requested lease may include a read lease, a write lease, and/or a handle lease. If the lease is a read lease, the client 202 is allowed to service requests from application 206A, for directory metadata of Dir. 2, from cache 212. If the lease is a write lease, any changes to the directory metadata of Dir. 2 can be stored in cache 212. If the lease includes a handle lease, client 202 can delay closing the handle to Dir. 2 when application 206A closes the handle. The handle can then be reused to service subsequent requests from application 206A as well as the other applications 206B and 206C. Redirector 210 will provide the directory metadata to application 206A and also store the directory metadata in cache 212.

At a later point in time, if a second client requests access to the same directory metadata stored in Dir. 2, server 204 may revoke a handle lease from client 202 if the second client requests access that is incompatible with the handle lease given to client 202. Server 204 will send a revoke notice 226 to client 202 indicating that the handle lease is being revoked. After revocation, any request for the directory metadata from applications 206A, 206B and 206C would require the client 202 to request a new directory handle directly from server 204. In some embodiments, the revocation of a lease occurs synchronously and the client 202 must send an acknowledgment 228 of having received the revocation notice. If at a later point in time a second client makes a modification to the directory metadata stored in Dir. 2, server 204 may revoke a read lease from client 202 which invalidates data stored in cache 212. After revocation, any request for the directory metadata from applications 206A, 206B, and 206C must be serviced by requesting the information directly from server 204.

As those with skill in the art will appreciate, the information in cache 212 can be used by client 202 for purposes that are in addition to providing directory metadata to applications 206A, 206B, and 206C. As one example, if a file does not exist in a directory, requests from applications 206A, 206B, and 206C for the missing file can be failed without having to redirect the request to the server 204. This helps reduce network traffic on open requests that target files that do not exist.

In one embodiment, the leasing features described above are transitive. That is, redirector 210 can pass the acquisition and revocation of leases to a local application. The local application could then be used to serve other remote clients. In this way, lease granting and revocation is essentially transitive back to the final peer.

FIGS. 3-6 illustrate operational flows 300, 400, 500, and 600 according to embodiments. Operational flows 300, 400, 500 and 600 may be performed in any suitable computing environment. For example, the operational flows may be executed by systems such as illustrated in FIG. 1 and FIG. 2. Therefore, the description of operational flows 300, 400, 500, and 600 may refer to at least one of the components of FIG. 1 and FIG. 2. However, any such reference to components of FIG. 1 and FIG. 2 is for descriptive purposes only, and it is to be understood that the implementations of FIG. 1 and FIG. 2 are non-limiting environments for operational flows 300, 400, 500 and 600.

Furthermore, although operational flows 300, 400, 500 and 600, are illustrated and described sequentially in a particular order, in other embodiments, the operations may be performed in different orders, multiple times, and/or in parallel. Further, one or more operations may be omitted or combined in some embodiments.

Figure 3:
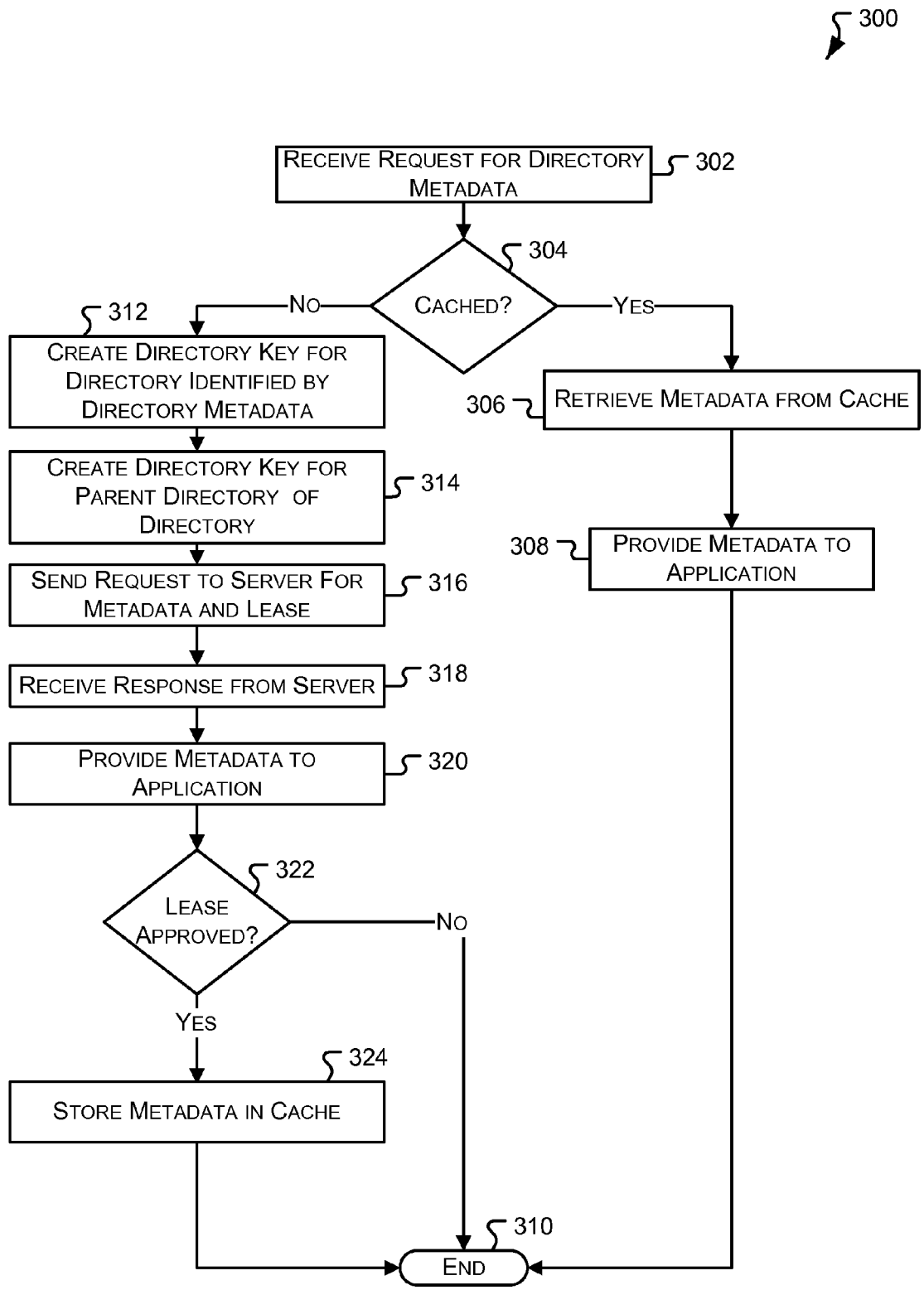
FIG. 3 illustrates an operational flow consistent with some embodiments for caching directory metadata locally.

FIG. 3 illustrates an operational flow 300 consistent with some embodiments for caching directory metadata locally. Flow 300 begins at operation 302 where a request for directory metadata (comprising a portion of directory metadata) is received from an application. In some embodiments, operation 302 is received by a redirector on a client, the redirector being part of a distributed file system such as system 100 (FIG. 1) or system 200 (FIG. 2). Flow 300 is not limited to being implemented using any particular file access protocol. Any appropriate file access protocol may be used to implement embodiments of flow 300.

Flow passes from operation 302 to decision 304 where a determination is made whether the requested metadata is stored within a local cache. If at decision 304 a determination is made that the requested metadata is stored in a local cache, flow passes to operation 306 where the metadata is retrieved from the local cache. At operation 308 the metadata retrieved from the local cache is provided to the application. Flow 300 ends at 310

If however at decision 304 a determination is made that the directory metadata is not stored in a local cache, control passes from decision 304 to operation 312 were a directory key for file identified by the directory metadata is created. In some embodiments, the directory key is a GUID that is generated by the redirector executing flow 300. After operation 312, a directory key for the parent directory of the directory identified by the directory metadata is generated at operation 314. In some embodiments, operation 314 may include generating keys for all ancestors of the directory. The keys can then be cached locally.

At operation 316, a request is sent to a file server. The request is for the metadata as well as a lease which allows the local caching of the metadata. At operation 318, a response is received from the file server. The response in embodiments will include an indication of whether the requested lease has been granted by the file server. From operation 318 flow passes to operation 320 where the metadata from the response is provided to the application. Following operation 320 a determination is made at decision 322 as to whether the server has granted the requested lease on the directory metadata. If at decision 322 a determination is made that the lease has not been approved, then the metadata cannot be cached locally and flow ends at 310. If at decision 322 a determination is made that the lease was approved by the file server, then the metadata is stored in a local cache at operation 324. After operation 324, flow ends at 310.

Figure 4:
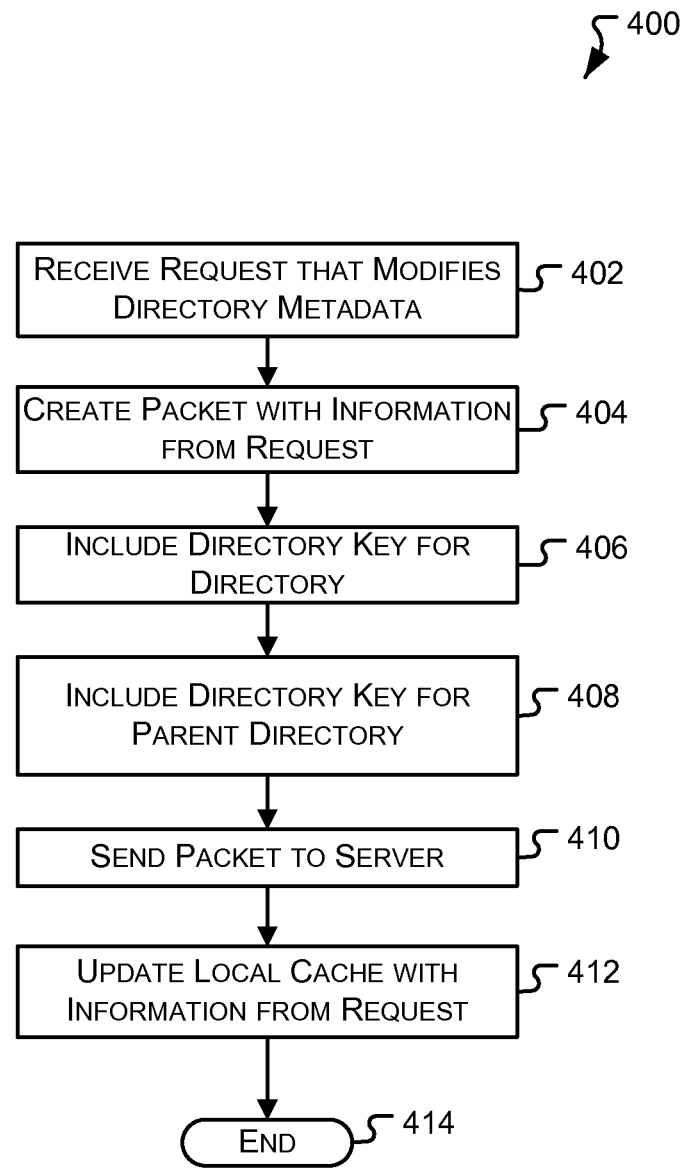
FIG. 4 illustrates an operational flow consistent with some embodiments for servicing requests that modify directory metadata by a client holding a lease on the directory metadata.

Referring now to FIG. 4, a flow 400 is illustrated consistent with some embodiments for servicing requests that modify directory metadata by a client (which accesses a distributed file system) holding a handle lease on the directory metadata. In embodiments, flow 400 may be executed after flow 300 has been executed. Thus, flow 400 is performed in embodiments in which a handle lease has been granted for caching directory metadata.

Flow 400 begins at operation 402 where a request is received that modifies directory metadata. The request may be for example a write request to write information into a file, which would change metadata; nonlimiting examples include a modification date, and file size. A handle lease for caching the directory metadata has previously been granted by a file server to a client that is executing flow 400.

At operation 404 a packet with information from the request, namely the information that's modifying the directory metadata, e.g., data to be written to a file, is created.

Because a lease has previously been granted, there is a first directory key and a directory key of the parent associated with the lease. Accordingly, the directory key is included in the packet at operation 406 and the directory key is included in the packet at operation 408. The packet is then sent to the server at 410. In some embodiments the client initially sends the directory key and directory key of the parent in the request for an open. The server will then use the keys for all subsequent operations on the open. In other embodiments however, the client may provide the directory key and the parent directory key with each operation.

After operation 410, flow passes to operation 412 where a local cache is updated to reflect the changed metadata. In other words, the local cache is updated to reflect the change in the most recent modification date, file size, etc. Flow 400 ends at 414.

Figure 5:
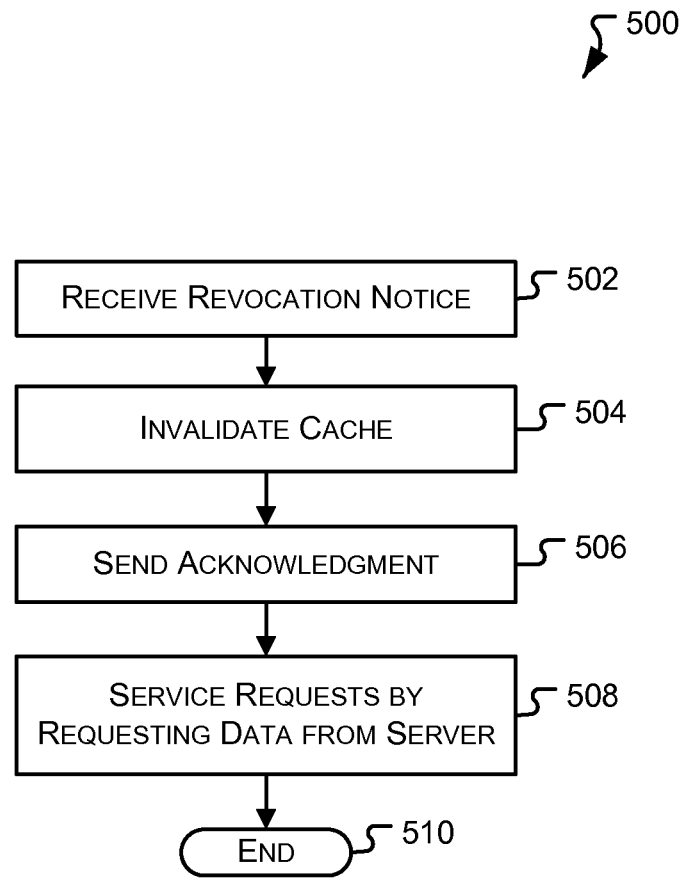
FIG. 5 illustrates an operational flow performed when a revocation of a read lease on directory data is received consistent with some embodiments.

FIG. 5 illustrates a flow 500 for processing a notice that revokes a read lease on directory metadata. Flow 500 may be executed after a client has been granted the read lease from a server, such as server 204 (FIG. 2). Flow 500 begins at operation 502 where a revocation notice is received from the server indicating that the previously granted read lease on directory metadata is being revoked. In some embodiments, the revocation notice is sent by the server because of an action that has been performed by another client which affects the coherency of the cached directory metadata, e.g., a modification to a file in the directory. In response to receiving the revocation notice, flow 500 passes to operation 504 where any cached directory metadata is invalidated. In some embodiments, operation 504 includes a number of steps taken by a client to indicate that the cache can no longer be used to provide directory metadata to applications that request the directory metadata.

After operation 504, flow passes to operation 506 where an acknowledgment is sent to the server that the revocation notice was successfully received. In some embodiments, flow 500 may not include operation 506. In these embodiments, a client receives the revocation notice and does not send an acknowledgment to the server. Flow then passes to operation 508 where any request for directory metadata is serviced by requesting the directory metadata from the server. Flow 500 then ends at 510.

Figure 6:
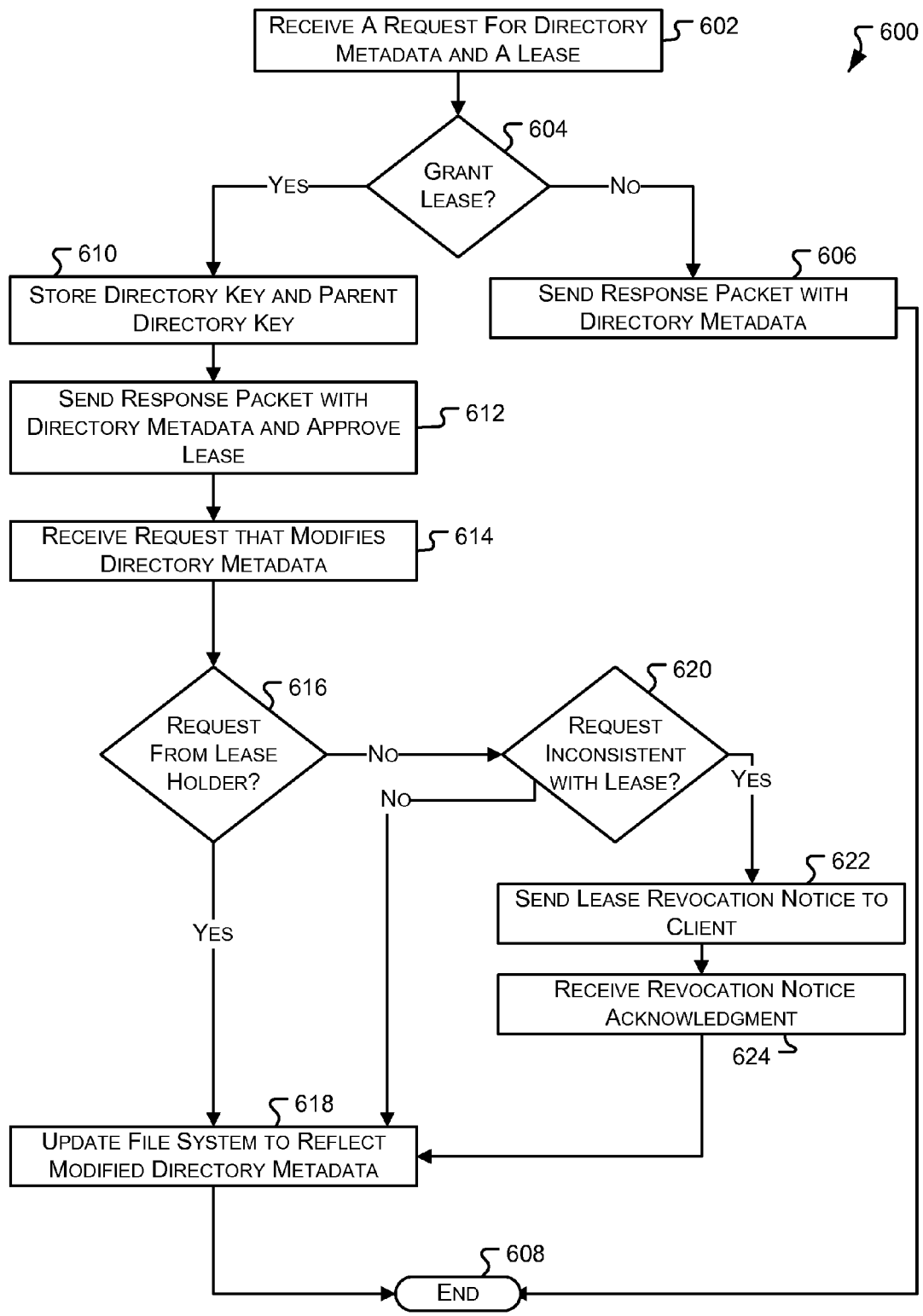
FIG. 6 illustrates an operational flow consistent with some embodiments for allowing directory metadata to be cached locally.

FIG. 6 illustrates an operational flow 600 consistent with some embodiments for allowing directory metadata to be cached locally. In some embodiments, flow 600 may be executed by a file server that is part of a distributed file system.

Flow 600 begins at operation 602 where request for directory metadata and a lease are received. The request is in some embodiments sent by a client, or a redirector on a client that is part of a distributed file system. After operation 602, flow 600 passes to decision 604 were a determination is made whether to grant a lease as requested in the request received at operation 602. Decision 604 may be based on a number of factors including for example whether a lease has already been granted for the directory metadata. If at decision 600 a determination is made not to grant a lease, flow passes to operation 606 where a packet with the directory metadata is sent. The packet will include an indication that the requested lease was not granted. Flow then ends at operation 608.

If at decision 604, a determination is made that a lease can be granted, flow 600 passes to operation 610 were a directory key and a parent directory key are stored. In some embodiments, the directory key and the parent directory key are GUIDS that are used as lease keys to keep track of leases granted to clients. The directory key and the parent directory key in some embodiments are received at operation 602 with the request for directory metadata and the lease request. In this embodiment, the directory and parent directory keys were generated by the client which sends the request at operation 602. In other embodiments, the directory key and the parent directory key may be generated by the server and are then stored in a lease table at operation 610.

In some embodiments, the directory key and the parent directory key express a container-child relationship between 2 or more open handles. The same is true for a file key and a directory key, the file key being associated with a file within the directory. For example, assume that there are 2 handles open H1 and H2. H1 may be associated with a file key=K1 and a directory key=D. H2 may be associated with a file key=K2 and a directory key=D. The keys indicate that the files referred to by these handles reside within the same directory.

Referring again to FIG. 6, at operation 612 a response packet with the requested directory metadata and indication of approval of the lease is sent to the client. The client can then locally cache the directory metadata consistent with the granted lease.

At operation 614 a request that modifies the directory metadata is received. The request may be for example to write additional information into a file. This will modify the directory metadata by for example changing the last modification time, or file size. Flow passes from operation 614 to decision 616 where a determination is made as to whether the request to modify the directory metadata is from the lease holder In one embodiment, the determination made at decision 616 is made by comparing the lease keys associated with a handle on which the operation is performed that modifies directory metadata, with lease keys associated with handles previously provided to clients. As noted above, in some embodiments a client generates the lease keys associated with file handles (or directory handles) and therefore each key will be unique to a particular client. In one example, handle H1 provided to a client is associated with a file key=K1 and a directory key=D. If later the server receives an operation that modifies metadata associated with a handle H2, the server compares the lease keys associated with handle H2 with the lease keys associated with handle H1. If for example H2 is associated with a file key=K2 and a directory key=D, the server determines that since the directory keys for H1 and H2 are the same, the same client that has the lease on the directory D made the modification, and therefore the lease does not need to be revoked. If, however, H2 is associated with a file key=K2 and a directory key=D1, the server will determine that since the directory keys associated with handles H1 and H2 are different, the lease must be revoked.

If a determination is made that the lease holder is the one making the modification to the directory metadata, flow passes to operation 618 wherein the file system is updated to reflect the modified directory metadata. Flow 600 then ends at 608.

If at decision 616 a determination is made that the request is not from the lease holder, flow passes to decision 620 where a determination is made whether the requested modification is inconsistent with the lease that has been given to another client. If the request is not inconsistent flow passes to operation 618 and ends at 608.

If at decision 620 a determination is made that the request is inconsistent with the lease, flow passes to operation 622 where a revocation notice is sent to the client that is currently holding the lease on the directory metadata. The revocation is sent in order to maintain coherency of the directory metadata among all of the clients that access the directory metadata. An acknowledgment of the revocation notice is received at operation 624, after which flow passes to operation 618 and ends at 608.

Figure 7:
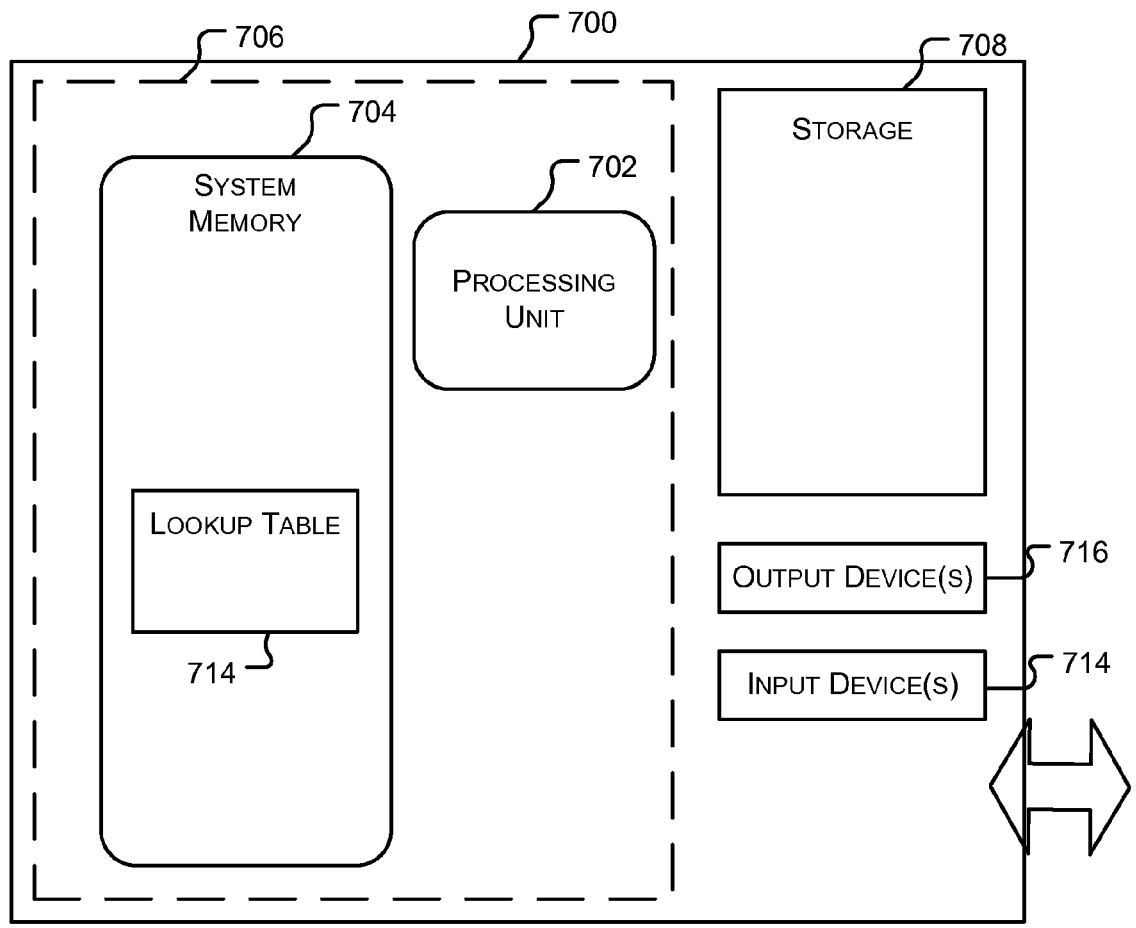
FIG. 7 illustrates a block diagram of a computing environment suitable for implementing embodiments.

FIG. 7 illustrates a general computer system 700, which can be used to implement the embodiments described herein. The computer system 700 is only one example of a computing environment and is not intended to suggest any limitation as to the scope of use or functionality of the computer and network architectures. Neither should the computer system 700 be interpreted as having any dependency or requirement relating to any one or combination of components illustrated in the example computer system 700. In some embodiments, system 700 may be used as a client and/or server described above with respect to FIGS. 1 and 2.

In its most basic configuration, system 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. System memory 704 stores applications that are executing on system 700. For example, memory 704 may store report lookup table 214 described above with respect to FIG. 2.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage, and non-removable storage 708 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 714 such as a keyboard, a mouse, a pen, a sound input device, a touch input device, etc. Output device(s) 616 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

We claim:

1. A computer implemented method of caching directory metadata locally, the method comprising:
   receiving a first request from an application for directory metadata;
   in response to receiving the first request, sending a second request to a server for the directory metadata, wherein the second request comprises:
      a request for a handle to a directory containing the directory metadata; and
      a request for a lease to cache directory metadata locally, wherein the lease allows local caching of directory metadata until the server revokes the lease;
      a generated key that is associated with a first directory that includes the requested metadata; and
      a generated directory key that is associated with a second directory, wherein the first directory is included in the second directory;
   receiving a first response from the server, the first response comprising the directory metadata and an indication of an approval of the request for the lease;
   storing the directory metadata in a local cache; and
   providing the directory metadata to the application.

2. The method of claim 1, wherein the request for the lease comprises a flag indicating a request for one or more of: read caching, write caching, and handle caching.

3. The method of claim 1, further comprising:
   receiving a third request from a second application for the directory metadata; and
   in response to receiving the third request, providing the directory metadata from the local cache.

4. The method of claim 1, further comprising:
   receiving a third request from a second application to modify a file stored in the second directory; and
   in response to receiving the third request:
      creating a file key associated with the file; and
      sending a forth request to the server, the fourth request comprising data from the third request, the file key associated with the file, and the second generated directory key.

5. The method of claim 1, further comprising storing the generated directory key and the generated key in a look-up table, wherein the look-up table stores the association of the generated key and the generated directory key.

6. The method of claim 1, wherein the request for the lease includes a request for the server to generate lease keys.

7. The method of claim 1, further comprising:
   receiving from the server a notice of revocation of the lease;
   in response to receiving the notice of revocation:
      sending an acknowledgement of receipt of the notice of revocation; and
      removing the directory metadata from the local cache.

8. The method of claim 1, further comprising:
receiving from the server a notice that the directory metadata has changed; and
sending an acknowledgement of receipt of the notice.

9. The method of claim 1, wherein the generated key is one of a directory key or a file key.

10. The method of claim 7, further comprising: after receiving the notice of revocation:
receiving a third request from a second application for the directory metadata; and
in response to receiving the third request, sending a fourth request to the server for the directory metadata.

11. A computer system configured to locally cache directory metadata, the system comprising:
at least one processor; and
a computer readable storage medium storing executable instructions that when executed by the at least one processor perform a method comprising:
receiving, at a server, a first request from a first client for directory metadata, wherein the first request comprises:
a request for a handle to a directory containing the directory metadata:
a request for a lease to cache directory metadata locally, wherein the lease allows local caching of directory metadata until the server revokes the lease;
a generated key that is associated with a first directory that includes the requested metadata; and
a generated directory key that is associated with a second directory, wherein the first directory is included in the second directory; and
sending, to the first client, a first response, the first response comprising the directory metadata and an indication of approval of the request for the lease.

12. The system of claim 11, wherein the request for the lease comprises a flag indicating a request for one or more of: read caching, write caching, and handle caching.

13. The system of claim 11, wherein the method further comprises:
receiving a second request;
determining whether the second request is received from a second client, the second request modifying the directory metadata.

14. The system of claim 11, wherein the method further comprises:
creating a file key associated with the handle to the directory and creating a directory key associated with a parent directory of the directory in response to receiving the first request; and
including the file key and the directory key in the first response sent to the first server.

15. The system of claim 13, wherein determining whether the second request is received from a second client comprises comparing a directory key from the second request with a previously stored directory key.

16. The system of claim 15, wherein the method further comprises sending a revocation notification to the first client to revoke the lease in response to determining that the directory key from the second request is not the same as a previously received directory key.

17. A computer readable storage device storing computer executable instructions that when executed perform a method comprising:
receiving at a client redirector a first request from an application for directory metadata;
in response to receiving the first request and transparent to the application:
creating a first globally unique identifier (GUID) associated with a first directory that contains the directory metadata and a second GUID associated with a second directory that contains the first directory; and
sending a packet formatted according to a file access protocol to a server for the directory metadata, wherein the packet comprises:
a request for a handle to the first directory;
a request for a lease to cache the directory metadata locally, wherein the lease allows local caching of the directory metadata until the server revokes the lease; and
the first GUID and the second GUID;
receiving a second packet from the server, the second packet comprising the directory metadata and an indication of approval of the request for the lease;
storing the directory metadata in a local cache; and
providing the directory metadata to the application.

18. The computer readable storage device of claim 17, wherein the method further comprises:
receiving a second request from a second application for the directory metadata; and
in response to receiving the second request, providing the directory metadata from the local cache.

19. The computer readable storage device of claim 18, wherein the method further comprises:
receiving a third request from a second application for modifying a file stored within the first directory; and
in response to receiving the third request:
creating a third GUID associated with the file; and
sending a third packet to the server with data from the third request, the third GUID associated with the file, and the second GUID associated with the second directory.

20. The computer readable storage device of claim 19, wherein the method further comprises storing the third GUID in a look-up table in association with the first GUID and the second GUID.

* * * * *